Nov. 13, 1951  L. L. EAKIN  2,575,262
VEHICLE HOIST
Filed Nov. 27, 1946

INVENTOR:
Lourie L. Eakin
BY
ATTORNEY.

Patented Nov. 13, 1951

2,575,262

UNITED STATES PATENT OFFICE 2,575,262

VEHICLE HOIST

Lourie L. Eakin, Ventura, Calif.

Application November 27, 1946, Serial No. 712,652

2 Claims. (Cl. 212—8)

My invention relates to hoisting apparatus, and particularly to a transporting vehicle, such as a motor truck, having means incorporated thereon for hoisting relatively heavy objects and placing them on the platform of the truck to be transported thereby.

Various hoisting or lifting devices are in use for loading motor trucks, and the like, and such devices are often erected on the truck itself and are operated by the driving mechanism of the truck. Such prior hoisting devices usually comprise a boom, which is pivoted on an axis extending transversely of the truck body to adapt it to pivot rearwardly to a position over the object to be lifted, and to hoist the object by means of a cable passing over a pulley at the end of the boom and adapted to be wound on the drum of a power winch.

After the object has been raised sufficiently, the boom is pivoted forwardly to locate the object over the body or platform of the truck and the object is lowered onto the platform. When the hoist is not in use, it is pivoted forwardly to overlie the cab of the truck and to project forwardly therefrom. Because the boom is relatively long, it extends upwardly to a considerable extent and is therefore apt to strike trees, communication wires, and other tall objects, and this presents a serious hazard. Besides, the projection of the inclined boom above the truck interferes with the steering of the vehicle, since it substantially raises the center of gravity thereof. Moreover, because the tip end of the boom is located at a considerable height above the ground, it is difficult to draw the cable around the pulley of a sheave in preparing the hoisting device for operation.

It is the primary object of this invention to obviate the faults of previous hoisting devices of the class referred to by providing a hoisting apparatus which has a boom adapted to be tilted rearwardly over an object to be lifted and to be thereafter pivoted forwardly to dispose of the object over the platform of the truck, after which the object may be lowered thereon, the boom being so shaped that when it is tilted to the extent of its forward movement it will overlie the cab of the truck in a horizontal position whereby to locate the end of the boom at a minimum distance above the ground. This object is best accomplished by constructing the boom with a pair of opposite legs having lower parallel portions, which are adapted to rest upon the platform of the truck when the boom is in inoperative position, intermediate portions inclined upwardly and forwardly at the rear of the cab, and forwardly extending portions which overlie the roof of the cab in close proximity thereto. Since the forward end of the boom is located relatively close to the ground, the cable may be conveniently passed therearound to prepare the hoist for operation.

Another object of the invention is to provide power means, preferably hydraulic jacks, for tilting the boom to operative and retracted positions.

Another object is to provide a hoisting apparatus of the type referred to which is strong and sturdy and adapted to sustain heavy objects, and to accurately place the objects in desired positions on the platform of the truck.

Another object of the invention is to provide a hoisting apparatus of the type indicated which is of simple construction, economical to manufacture, and one which may be readily installed on existing trucks without materially altering the truck structure.

Further objects of the invention are set forth in the following specification which describes a preferred embodiment thereof, by way of example, as illustrated by the accompanying drawings. In the drawings.

Figure 1:
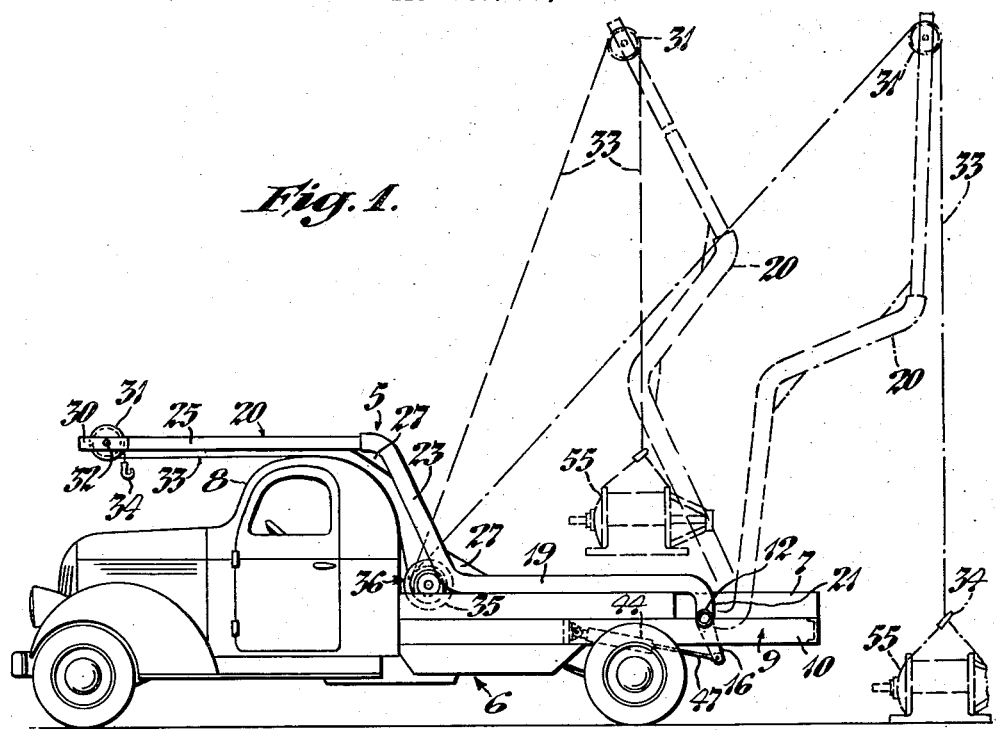
Fig. 1 is a side elevational view of a motor truck on which is embodied a hoisting apparatus constructed in accordance with my invention.

Referring to the drawings in detail, my improved hoisting apparatus 5 is herein shown as mounted on a conventional motor truck 6, which is provided with a platform 7, and a driver's cab 8 mounted on the chassis 9. Fixed to the side rails 10 of the chassis 9 are relatively long tubular bearings 12, which are adapted to receive a tubular axle or cross-piece 13 to adapt the latter to rotate on an axis extending transversely of the truck. The axle 13 is provided with two spaced pairs of arms 15 and 16, which are used for a purpose to be explained later.

Welded or otherwise secured to the ends of the axle 13 are the ends of the lower or rearward portions 19 of the boom 20. The portions 19 extend at right angles to the axle 13 and parallel to each other, and are provided with angular extensions 21 which are directly secured to the axle 13, see Fig. 1. The forward ends of the parallel portions 19 extend to a point close to the rear of the cab 8, and are bent upwardly or inclined to provide intermediate portions 23, which terminate at a point slightly above and substantially flush with the rear of the cab, as shown by full lines in Fig. 1. The part of the boom thus far described is preferably made from strong tubing, such as drill pipe. The intermediate portions 23, in addition to being inclined upwardly, also slope inwardly toward each other, as shown in Fig. 2.

Tubular members 25 and 26 are arranged with their rearward ends disposed to the forward ends of the intermediate portions 23, and are preferably welded therein. The members 25 and 26 constitute the forward or upper end of the boom 20, and converge forwardly to meet in an acute angle, as shown in Fig. 2, the meeting ends of these members being welded together to provide a secure joint. At the points of intersection between the parallel portions 19 and the intermediate portions 23, and also between the intermediate portions 23 and the forward portions 25, 26, are gusset plates 27 which greatly strengthen the structure.

Welded to the forward end of the boom 20 is a U-shaped element 30, between the sides of which a grooved pulley or sheave 31 is rotatably mounted on a cross-pin 32. A cable 33 passes over the sheave 31 and has a suitable hook 34 at one end. The other end of the cable 33 is wound around the drum 35 of a power winch, indicated at 36 in Figs. 1 and 2. The drum 35 may be rotated at a slow rate of speed by a gear reduction mechanism, which is driven from the motor of the truck, these connections not being herein shown or described since they may be of any known construction.

Pivoted on pins 40 extending between lugs 41 on a cross-strut 42 of the chassis 9 of the truck are the forward ends of hydraulic jacks 43 and 44, which have cylinders 45 in which pistons 46 are slidable. The pistons 46 have rods 47 which are pivotally connected by pins 48 to the arms 15 and 16 of the axle 13, previously described. It will thus be apparent that when the pistons 46 are slid axially in the cylinders 45, the axle 13 will be turned in the bearings 12, clockwise movement of the axle, as viewed in Fig. 1, acting to pivot the boom 20 rearwardly, as shown by the dot-and-dash lines in Fig. 1, and pivotal movement in the opposite direction serving to pivot the boom to retracted position, as shown by the full lines. The hydraulic jacks 43 and 44 are operated by hydraulic fluid selectively introduced into either end of the cylinders 45 through lines 49 and 50, the flow of fluid being controlled by a selector valve 51 which may be located at any convenient point, such as in the cab of the vehicle.

Figure 2:
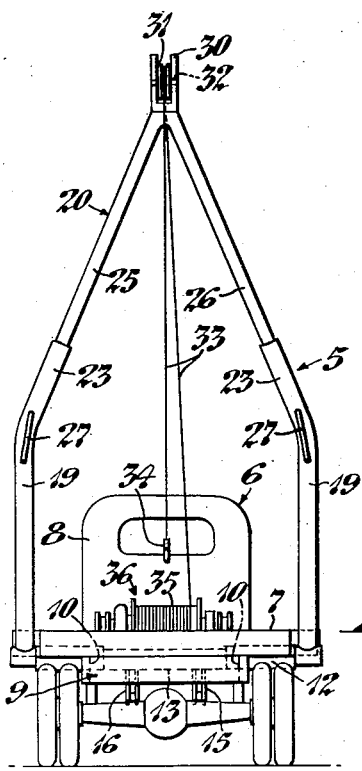
Fig. 2 is a rear view of the same, showing the boom in raised position.
Figure 3:
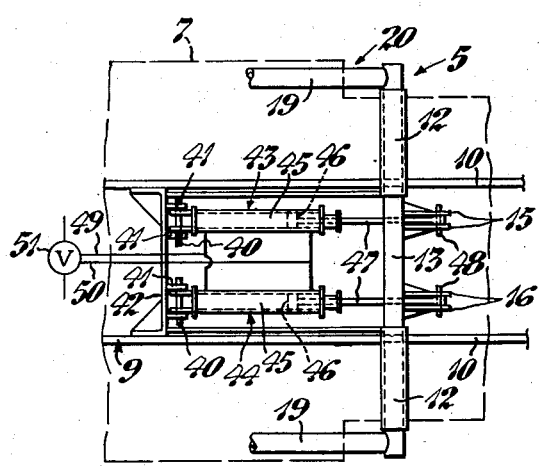
Fig. 3 is a fragmentary plan view of the rear end of the truck and hoisting apparatus, showing the hydraulic means for operating the boom.

Assuming that the boom 20 is in the position shown by the full lines in Fig. 1, the horizontal parallel portions 19 rest on the platform 7 of the truck 6, and the forward ends 25 and 26 overlie the roof of the cab 8 and project over the hood of the truck. Since the portions 25 and 26 are horizontally arranged, they will not strike trees, bridges, or other overhead obstructions along the roadway, as the truck is driven therealong. Moreover, because the boom is relatively low the steering of the truck is not affected and the truck may be easily maneuvered. When it is desired to transport a relatively heavy object, such as the electric motor 55, shown by dash lines in Fig. 1, the boom 20 is tilted rearwardly to the position indicated by dot-and-dash lines by manipulating the selector valve 51. After the boom 20 has been thus positioned, the winch 36 is operated to pay out the cable 33, and the cable is then looped around the motor 55, as shown, after which the winch is operated to wind up the cable to locate the motor 55 at a level above the platform 7. The hydraulic jacks 43 and 44 are then actuated to cause the boom 20 to be tilted forwardly to a position, such as shown by dash lines, whereby to dispose the motor 55 over the platform 7, after which the winch 36 is operated to permit the motor to descend upon the platform, the placing of the motor being controlled by the setting of the boom. After the motor 55 has been placed on the platform 7, the boom may be retracted to inoperative position, and the motor transported to any desired location. To unload the motor 55 from the truck, the hydraulic jacks 43 and 44 and the power winch 36 are operated in reverse order to first lift it from the platform 7 and swing it rearwardly beyond the rear end of the truck and then lower it to the desired location.

While I have herein shown and described the hoisting apparatus as embodied in a preferred form of construction and applied to use in a particular manner, it is to be understood that various modifications may be made in the structure thereof and in the mode of operation thereof without departing from the spirit or scope of the invention. Therefore, without limiting myself in this respect, I claim:

1. A hoisting device adapted for use with a vehicle having a platform and a cab, comprising: a bifurcated boom member having opposite legs provided with parallel portions at one end, angular intermediate portions and convergent portions at the other end disposed in a plane offset with respect to the plane of said parallel portions; means for pivotally mounting said parallel portions on an axis extending transversely of said platform; and power means for pivoting said boom member to cause said boom member to move to a substantially erect operative position, to a substantially horizontal retracted position, and to positions intermediate said operative and retracted positions, said convergent offset portions being disposed horizontally and adapted to overlie said cab when said boom member is moved to retracted position.

2. A hoisting device adapted for use with a vehicle having a platform and a cab, comprising: a bifurcated boom member having opposite legs provided with parallel portions formed with right-angular extensions at one end, intermediate portions projecting angularly from said parallel portions at the other end thereof, and end portions disposed in a plane offset with respect to the plane of said parallel portions, said intermediate and end portions converging; means for pivotally mounting said extensions on an axis extending transversely of said platform; and power means for pivoting said boom member on said axis to cause said boom member to move to a substantially erect operative position, to a substantially horizontal retracted position, and to positions intermediate said operative and retracted positions, said convergent offset end portions being disposed horizontally and adapted to overlie said cab when said boom member is moved to retracted position.

LOURIE L. EAKIN.

(References on following page)

REFERENCES CITED

The following references are of record in the file of this patent:

UNITED STATES PATENTS

| Number | Name | Date |
|---|---|---|
| 614,792 | Cooper et al. | Nov. 22, 1898 |
| 653,121 | Schneemann | July 3, 1900 |
| 940,148 | Hammond | Nov. 16, 1909 |
| 1,408,002 | Heymoss | Feb. 28, 1922 |
| 1,489,161 | Schuchert | Apr. 1, 1924 |
| 1,817,859 | Cohen-Venezian | Aug. 4, 1931 |
| 2,110,753 | Zeilman | Mar. 8, 1938 |
| 2,181,253 | Willis | Nov. 28, 1939 |
| 2,183,867 | Johansen | Dec. 19, 1939 |
| 2,290,738 | Chadwick | July 21, 1942 |
| 2,301,808 | Mosher | Nov. 10, 1942 |
| 2,353,655 | Day | July 18, 1944 |
| 2,386,759 | Ulm | Oct. 16, 1945 |
| 2,433,598 | Chadwick | Dec. 30, 1947 |
| 2,493,099 | Adams | Jan. 3, 1950 |